United States Patent
Wagner

(10) Patent No.: US 12,229,329 B2
(45) Date of Patent: Feb. 18, 2025

(54) METHOD FOR REPRESENTING AN ENVIRONMENT BY MEANS OF A DISPLAY UNIT ARRANGED ON A PERSON AND VISIBLE FOR THE PERSON

(71) Applicant: NEKONATA XR TECHNOLOGIES GMBH, Mödling (AT)

(72) Inventor: Martin Wagner, Mödling (AT)

(73) Assignee: Nekonata Xr Technologies GmbH, Mödling (AT)

( * ) Notice: Subject to any disclaimer, the term of this patent is extended or adjusted under 35 U.S.C. 154(b) by 68 days.

(21) Appl. No.: 17/909,029

(22) PCT Filed: Mar. 2, 2021

(86) PCT No.: PCT/AT2021/060068
§ 371 (c)(1),
(2) Date: Sep. 2, 2022

(87) PCT Pub. No.: WO2021/174273
PCT Pub. Date: Sep. 10, 2021

(65) Prior Publication Data
US 2023/0195209 A1  Jun. 22, 2023

(30) Foreign Application Priority Data
Mar. 5, 2020  (AT) .............................. A 50170/2020

(51) Int. Cl.
*G06F 3/01*  (2006.01)
*G06T 5/70*  (2024.01)
(Continued)

(52) U.S. Cl.
CPC ................ *G06F 3/011* (2013.01); *G06T 5/70* (2024.01); *G06T 7/70* (2017.01); *G06T 19/006* (2013.01);
(Continued)

(58) Field of Classification Search
CPC ............ G06T 7/70; G06T 2207/30268; H04N 13/344
See application file for complete search history.

(56) References Cited

U.S. PATENT DOCUMENTS

| 9,911,236 B2 | 3/2018 | Bar-Zeev et al. |
| 9,995,936 B1 * | 6/2018 | Macannuco ............ G06F 3/011 |

(Continued)

FOREIGN PATENT DOCUMENTS

| CN | 110764620 A | 2/2020 | |
| DE | 102017127346 A1 * | 5/2018 | ............... B60Q 1/44 |

(Continued)

OTHER PUBLICATIONS

FOR (Year: 2017).*

*Primary Examiner* — Samantha (Yuehan) Wang
(74) *Attorney, Agent, or Firm* — Laurence A. Greenberg; Werner H. Stemer; Ralph E. Locher

(57) ABSTRACT

A method represents an environment via a display unit arranged on a person and visible for the person as a display image within the scope of a simulation. The simulation is carried out in an interaction environment, wherein a number of actuatable interaction elements are arranged in the interaction environment. An interaction environment image capture, depicting the interaction environment, is created by use of a first image capturing unit arranged on the person or relative to the person. A position of the person is determined in the interaction environment and based on the position of the person an environment image is provided. An image mask is provided which depicts the individual interaction elements contained in the interaction environment image capture and is represented in the display image. The interaction environment image capture and the environment (Continued)

image are superimposed using the image mask and then displayed on the display unit.

18 Claims, 4 Drawing Sheets

(51) Int. Cl.
   *G06T 7/70*       (2017.01)
   *G06T 19/00*      (2011.01)
   *H04N 13/111*     (2018.01)
   *H04N 13/239*     (2018.01)
   *H04N 13/344*     (2018.01)
   *G09B 9/05*       (2006.01)

(52) U.S. Cl.
   CPC ......... *H04N 13/111* (2018.05); *H04N 13/239* (2018.05); *H04N 13/344* (2018.05); *G06T 2207/30196* (2013.01); *G06T 2207/30268* (2013.01); *G09B 9/05* (2013.01); *H04N 2213/008* (2013.01)

(56) References Cited

U.S. PATENT DOCUMENTS

| | | |
|---|---|---|
| 11,386,673 B2 | 7/2022 | Moosaei et al. |
| 2010/0245387 A1* | 9/2010 | Bachelder ............. G06T 19/006 345/633 |
| 2012/0206452 A1 | 8/2012 | Geisner et al. |
| 2016/0148429 A1* | 5/2016 | Groppa ................. G09G 5/026 345/419 |
| 2018/0204478 A1 | 7/2018 | Banga |
| 2018/0218631 A1 | 8/2018 | Wright et al. |
| 2019/0019430 A1* | 1/2019 | Steib ........................ G09B 9/05 |
| 2019/0130783 A1 | 5/2019 | Nissen et al. |

FOREIGN PATENT DOCUMENTS

| | | |
|---|---|---|
| WO | 2012039877 A1 | 3/2012 |
| WO | 2016079476 A1 | 5/2016 |

\* cited by examiner

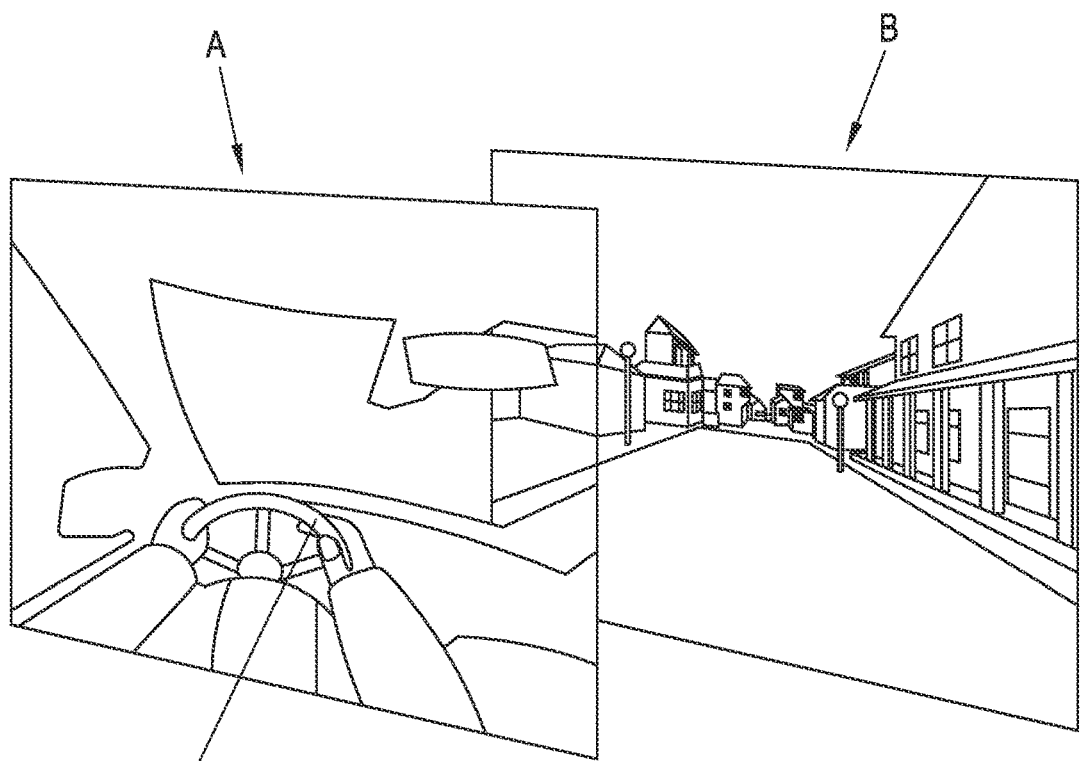
3a'
Fig. 2
Fig. 3
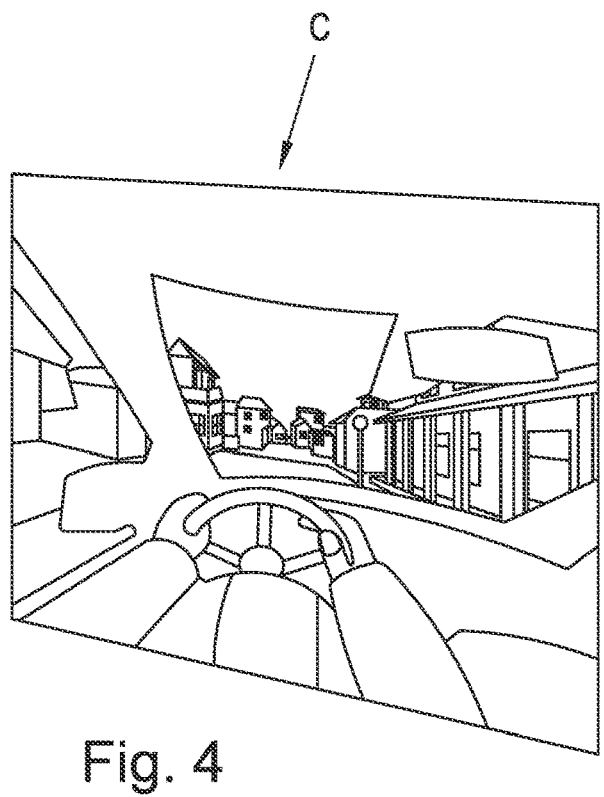
Fig. 4

METHOD FOR REPRESENTING AN ENVIRONMENT BY MEANS OF A DISPLAY UNIT ARRANGED ON A PERSON AND VISIBLE FOR THE PERSON

FIELD AND BACKGROUND OF THE INVENTION

The invention relates to a method for displaying an environment by means of a display unit arranged on a person and visible for the person as a display image in the context of a simulation according to the independent method simulation claim and a simulation arrangement according to the independent simulation arrangement claim.

Various methods and devices for representing an environment as a display image for a person in the context of a simulation are known from the prior art. For this purpose, for example, portable display devices having display screens, for example head-mounted displays, are used, which are either partially transparent, so that the environment can be partially perceived or shown through the display, while other areas are overlaid by virtual screens. Such devices are known, for example, from US 2018204478 A1, WO 2012039877 A1, and US 2012206452 A1. Such display devices can be combined with input devices such as gloves having integrated sensors or input devices held in the hand, in order to give the user the option of having influence on the simulation. WO 2016079476 A1 discloses, for example, that virtual control elements are shown for the user who can operate them virtually.

However, in the methods and devices known from the prior art, the interaction options for the user with the simulation are restricted. Furthermore, for example, with partially transparent display media, visible artifacts can occur in the simulation in the field of view of the user, since the depiction of the environment is only overlapped with a virtual representation and the field of view of the user is thus restricted. Furthermore, in the methods known from the prior art, virtual objects can only be shown at predetermined positions in the real space or image.

SUMMARY OF THE INVENTION

The object of the invention is therefore to provide a remedy in this regard and to provide a method and a device for representing an environment by means of a display unit arranged on a person and visible for the person as a display image in the context of a simulation, which ensure the most unrestricted possible field of view for the user without, for example, artifacts resulting from a superposition, which occur with transparent display units, and enable a user to interact with the simulation or influence the simulation in a particularly realistic manner.

The invention achieves this object with a method according to the independent method claim. It is provided according to the invention that to represent an environment by means of a display unit arranged on a person and visible for the person, in particular by means of a set of 3D glasses, as a display image in the context of a simulation, the simulation is carried out in an interaction environment, in particular a cockpit, wherein a number of actuatable interaction elements are arranged in the interaction environment and wherein the simulation is influenceable by means of the interaction elements, at least one interaction environment recording depicting at least parts of the interaction environment, in particular two interaction environment recordings, is created by means of at least one first image recording unit arranged on the person or relative to the person, the position of the person in the interaction environment is ascertained and an environment image from a virtual and/or real environment is provided in dependence on the position of the person, wherein an image mask is provided, wherein individual positions on the at least one interaction environment recording, the environment image, the image mask, and the display image are associated with one another, wherein an item of interaction environment distance information between the person and the interaction environment is ascertained and the interaction environment distance information is associated position by position, in particular pixel by pixel, with the individual image areas of the at least one interaction environment recording, and/or at least one image parameter value, in particular an image parameter value selected from image sharpness value, brightness value, contrast value, color value, of the individual image areas of the at least one interaction environment recording is ascertained position by position, in particular pixel by pixel, and the image mask is created in such a way that the depiction of the individual interaction elements contained in the at least one interaction environment recording is represented in the display image by checking whether the object area of the interaction environment depicted in the respective image area of the at least one interaction environment recording exceeds a predetermined interaction environment distance threshold value, and/or whether the respective image area of the at least one interaction environment recording exceeds at least one image parameter threshold value predetermined for the interaction environment, in particular at least one image parameter threshold value selected from image sharpness threshold value, brightness threshold value, contrast threshold value, color threshold value, the at least one interaction environment recording and the provided environment image are superimposed pixel by pixel using the image mask, and the image superimposed in this way is displayed as the display image on the display unit.

It is advantageously possible by way of these features according to the invention to select the depiction of parts of the interaction environment, for example, within a predetermined distance around the person, for example, on which the first image recording unit is arranged, or, for example, on the basis of its surface quality, and merge it with a provided environment image, for example, a provided depiction of a virtual environment, to form a single display image for the user. This means that, for example, the hands of a user and the interaction elements, such as a steering wheel or a shift lever, which are in range of the hands, can be displayed in the display image so that the realism of the simulation is improved and the user receives the most realistic possible perception of space in the simulation. In this way, it is also possible to prevent the user from feeling unwell during the simulation, which can occur if the spatial perception of the person is disturbed during the simulation.

Furthermore, for example, the hands of the user or the interaction elements are not shown at predetermined positions in space, but rather are merged in dependence on the position of the person in the interaction environment using the image mask with the environment image to form a single display image and are visible at arbitrary positions in the display image, which result from the position of the person. This position in the display image can therefore advantageously change, for example, when the person moves in the interaction environment, for example, turns the head and inclines the upper body.

A method according to the invention is particularly advantageous for teaching persons, for example, to deal with greatly varying devices or for training the correct behavior in, for example, greatly varying traffic situations.

An interaction environment refers hereinafter to a real environment in which the simulation is carried out, for example, a cockpit of an automobile or a desk having a seat. Objects by means of which the user can influence the simulation are referred to as interaction elements, for example, a steering wheel, shift lever, control buttons, rocker switches, a controller, etc. Such interaction elements are arranged in the interaction environment, for example fixedly integrated. A display image refers to the image which is displayed for the user by the display unit, for example a set of 3D glasses. A simulation environment is understood hereinafter as a real or virtual environment which is to be simulated for the user, for example, a real or virtual street, if the control, for example, of an automobile is to be simulated for the user.

An image mask is understood hereinafter as a 2D image, a 3D model, or coherent image or spatial positions which define a shape, surface or lines or beams, or combinations thereof, which can be used to merge virtual or real image recordings originating from different sources, such as the interaction environment recording and the environment image, to form a single display image.

Image parameter values are understood hereinafter as alphanumeric variables, which define specific image properties or properties of individual image points or image areas of an image recording. This relates to static (a posteriori) properties, which define an existing image (for example brightness value), and also a priori properties, which are defined by the image recording unit and influence the image recording (for example f-stop of a camera). Image parameter values can be, for example, an image sharpness value, brightness value, contrast value, or color value.

An image sharpness value is understood hereinafter as a value which describes the detail recognition of image contents. This includes both physical sharpness, thus the edge sharpness of individual image sections, which supplies a statement about the punctiform transition from light to dark, and also the subjective sharpness impression, in dependence on image optimization, resolution, artifacts, and other factors.

Brightness value is understood hereinafter as the amount of white of an image area or the measured value of the illumination or luminance, which results due to ambient light.

Contrast value is understood hereinafter as a ratio between the brightest and darkest image areas of a recording or a ratio of the different brightnesses of adjacent image areas of a recording in relation to one another.

Color value is understood hereinafter as the amount of red, green, and blue components of a specific pixel or image area of a recording.

To be able to represent greatly varying simulation environments for a user in a display image in greatly varying simulation applications in a particularly simple manner and to enable this so as to provide a particularly realistic simulation for the respective simulation environment, it can be provided that for the provision of the environment image at least one simulation environment recording depicting at least parts of a simulation environment, in particular two simulation environment recordings, is created by means of at least one second image recording unit arranged in the simulation environment, wherein the position of the second image recording unit in the simulation environment is ascertained, and wherein the environment image from the simulation environment is provided in dependence on the position of the person and the position of the second image recording unit in such a way that the recording areas of the first image recording unit and the second image recording unit are coupled to one another, wherein the image mask is provided in such a way that individual positions on the at least one interaction environment recording, the at least one simulation environment recording, the image mask, and the display image are associated with one another, wherein an item of simulation environment distance information between the at least one second image recording unit and the simulation environment is ascertained and the simulation environment distance information is associated with the individual image areas of the at least one simulation environment recording position by position, in particular pixel by pixel, and/or at least one image parameter value, in particular an image parameter value selected from image sharpness value, brightness value, contrast value, color value, of the individual image areas of the at least one simulation environment recording is ascertained position by position, in particular pixel by pixel, and wherein the image mask is created by additionally checking whether the object area of the simulation environment depicted in the respective image area of the at least one simulation environment recording exceeds a predetermined simulation environment distance threshold value and/or whether the respective image area of the at least one simulation environment recording exceeds at least one image parameter threshold value predetermined for the simulation environment, in particular at least one image parameter threshold value selected from image sharpness threshold value, brightness threshold value, contrast threshold value, color threshold value, and wherein the at least one interaction environment recording and the provided environment image from the simulation environment are superimposed pixel by pixel using the image mask to create the display image.

In this way, an environment image from a real environment, i.e., the simulation environment, can be provided, wherein the recording areas of the first and the second image recording unit are coupled to one another in such a way that the viewing direction of the user in the interaction environment corresponds to the viewing direction of the image recording unit in the simulation environment. It is thus advantageously possible that a user of the simulation has the impression as if he were actually located in the simulation environment and can interact by means of the interaction elements in the interaction environment with the simulation environment.

A simulation environment refers hereinafter to a real environment which is to be simulated for the user.

"Coupled" recording areas are to be understood in this context to mean that the recording area of the first image recording unit and the recording area of the second image recording unit are in relation to one another in such a way that the movement or translation and rotation of the respective one image recording unit results in a translation and rotation of the respective other image recording unit.

A particularly exact superposition of the interaction environment recording with the provided environment image can be achieved if the image mask is created in that the distance information created position by position, in particular pixel by pixel, and/or the image parameter value ascertained position by position, in particular pixel by pixel, in particular the sharpness value and/or brightness and/or contrast value and/or color value, is used to ascertain, in particular by threshold value comparison, whether and/or to what extent the at least one interaction environment recording and/or the provided environment image are used for the creation of the display image.

Hard transitions and edges in the display image and camera artifacts and artifacts which are to be attributed to varying exposure can thus advantageously be avoided, and objects in the interaction environment, which are not to appear in the display image, can be removed particularly reliably.

A particularly exact item of distance information for the creation of the image mask can be obtained if the distance information is ascertained on the basis of the interaction environment recording, and/or possibly on the basis of the simulation environment recording, and/or
  if the distance information is ascertained by means of a distance sensor arranged on the person, in particular the display unit, and/or possibly on the second image recording unit,
  wherein it is provided in particular that a distance image of the interaction environment, and/or possibly the simulation environment, is created by means of the distance sensor.

A further improvement of the image mask can be achieved if, in the case that multiple different distance sensors, which are based in particular on different physical measurement principles, are provided,
  a change of the distance sensor, the distance information of which is used to create the image mask, is performed according to predetermined criteria, in particular in dependence on the time of day, the solar radiation, the ambient lighting, surface properties of objects in the interaction environment and/or the simulation environment.

A particularly exact distance value, which can be obtained without the use of additional distance sensors, can be provided if the items of distance information provided by multiple distance sensors are used as the foundation for the creation of an overall image mask. In this way, it is possible to ascertain items of distance information directly on the basis of the depiction of the interaction environment, i.e., the interaction environment recording.

A further improvement of the image mask or a more reliable removal of objects which are not to be visible in the display image can be achieved if the distance information is provided by an algorithm on the basis of the at least one interaction environment recording, and/or possibly the simulation environment recording, which algorithm is based on technologies of machine learning, in particular artificial neural networks and/or support vector machines,
  wherein it is provided in particular that a neural network is trained on the basis of training data, wherein the training data comprise recordings, the image pixels of which are linked to items of distance information.

Such an embodiment of a method according to the invention advantageously enables items of distance information in the interaction environment or the simulation environment to be provided by an algorithm, which is based on technologies of machine learning, for example artificial neural networks and/or support vector machines. If a neural network is used to provide the items of distance information, for example, this neural network can be trained on the basis of training data, wherein these training data comprise recordings, for example, from interaction environments or simulation environments S, the image pixels of which are linked to items of distance information. If an interaction environment recording or a simulation environment recording is subsequently supplied to the neural network, the neural network can thus associate items of distance information with the individual image areas.

An especially time-saving and computing power-saving creation of a display image can be achieved if an envelope object is defined with respect to the interaction environment, and/or possibly the simulation environment, for the check of whether an object area of the interaction environment depicted in an image area of the at least one interaction environment recording, and possibly an object area of the simulation environment depicted in an image area of the at least one simulation environment recording, exceeds a predetermined distance threshold value.

A further improvement of the exclusion of objects which are not to be displayed in the display image can be achieved if depictions of objects are ascertained in the at least one interaction environment recording, and/or possibly the at least one simulation environment recording as an environment image from the simulation environment, the surface of which has a predetermined superficially recognizable property, in particular a predetermined brightness or color or a predetermined pattern, and
  if the depictions of the objects ascertained in this way are not used for the superposition of the at least one interaction environment recording and the environment image.

A particularly realistic display image can be obtained if a superposition zone is predetermined in a predetermined distance area around the predetermined distance threshold value, in particular around the envelope object, and
  if upon the superposition of the at least one interaction environment recording and the provided environment image, in particular the environment image of the simulation environment, in each case the transparency of those image points of the at least one interaction environment recording and the environment image is predetermined, in particular according to a predetermined function, which depict object areas within this superposition zone,
  wherein it can be provided in particular that those image points of the at least one interaction environment recording and the provided environment image, which depict object areas, the distance of which corresponds to the distance threshold value, are predetermined to be equally transparent upon the superposition.

By way of such a selection of the transparency of the interaction environment recording and the environment image, a particularly realistic display image can be achieved, in which undesired interfaces or edges in the superposition area are not visible.

A further improvement of the display image can be achieved if the image mask is smoothed in the superposition area of the at least one interaction environment recording and the provided environment image, so that the individual pixel values of the image mask define a ratio in which the relevant pixel values of the at least one interaction environment recording and the provided environment image are superimposed on one another.

A particularly realistic display image can be achieved if the exposure and/or f-stop of the first image recording unit and/or the second image recording unit is adapted to objects, the distance of which exceeds the predetermined distance threshold value.

The object of the invention is furthermore to provide a simulation arrangement for the representation of an environment as a display image in the context of a simulation, using which the method according to the invention can be carried out, and which enables a particularly realistic interaction in the context of the simulation for a user.

This object is achieved by the features of the independent simulation arrangement claim. It is provided according to the invention here that the simulation arrangement comprises the following components:

a display unit arrangeable on a person, in particular a set of 3D glasses, which is designed to display received display images for a person, an interaction environment, in particular a cockpit, wherein a number of actuatable interaction elements are arranged in the interaction environment, wherein the simulation is influenceable by means of the interaction elements, at least one first image recording unit arrangeable on a or relative to a person, which is designed to create at least one interaction environment recording, in particular two interaction environment recordings, at least of parts of the interaction environment at a respective recording point in time, and a control and processing unit in data communication with the display unit and the first image recording unit, wherein the control and processing unit is designed to ascertain the position of a person in the interaction environment and provide an environment image from a virtual and/or real environment in dependence on this position, to activate the at least one image recording unit to create interaction environment recordings, to ascertain or process an item of distance information between the person and the interaction environment and to associate the distance information with the individual image areas of the at least one interaction environment recording position by position, in particular pixel by pixel, and/or to ascertain at least one image parameter value, in particular an image parameter value selected from image sharpness value, brightness value, contrast value, color value, of the individual image areas of the at least one interaction environment recording position by position, in particular pixel by pixel, and to create an image mask in such a way that the depiction of the individual interaction elements contained in the at least one interaction environment recording is represented in the display image by checking whether the object area of the interaction environment depicted in the respective image area of the at least one interaction environment recording exceeds a predetermined interaction environment distance threshold value, and/or whether the respective image area of the at least one interaction environment recording exceeds at least one image parameter threshold value predetermined for the interaction environment, in particular at least one image parameter threshold value selected from image sharpness threshold value, brightness threshold value, contrast threshold value, color threshold value, to associate individual positions on the at least one interaction environment recording, the environment image, the image mask, and the display image with one another, to superimpose the at least one interaction environment recording and the provided environment image pixel by pixel using the image mask, and to transmit the image superimposed in this way as a display image to the display unit.

A particularly realistic simulation of an interaction with a real simulation environment can be achieved if the simulation arrangement for providing the environment image comprises at least one second image recording unit arranged in a simulation environment, which is designed to create at least one simulation environment recording, in particular two simulation environment recordings, depicting at least parts of a simulation environment, wherein the control and processing unit is in data communication with the second image recording unit, and if the control and processing unit is designed to ascertain the position of the second image recording unit in the simulation environment, to activate the at least one second image recording unit to provide the environment image from the simulation environment in dependence on the position of the person in the interaction environment and the position of the second image recording unit in such a way that the recording areas of the at least one first image recording unit and the at least one second image recording unit are coupled to one another, to ascertain or process an item of distance information between the at least one second image recording unit and the simulation environment and to associate the distance information with the individual image areas of the at least one simulation environment recording position by position, in particular pixel by pixel, and/or to ascertain at least one image parameter value, in particular at least one image parameter value selected from image sharpness value, brightness value, contrast value, color value, of the at least one simulation environment recording position by position, in particular pixel by pixel, and to create the image mask by additionally checking whether the object area of the simulation environment depicted in the respective image area of the at least one simulation environment recording exceeds a predetermined simulation environment distance threshold value and/or whether the respective image area of the at least one simulation environment recording exceeds at least one image parameter threshold value predetermined for the simulation environment, in particular at least one image parameter threshold value selected from image sharpness threshold value, brightness threshold value, contrast threshold value, color threshold value, to associate individual positions on the at least one interaction environment recording, the simulation environment recording as an environment image, the image mask, and the display image with one another, and to superimpose the at least one interaction environment recording and the provided environment image from the simulation environment pixel by pixel using the image mask to create the display image.

A particularly exact distance value can be provided if the simulation arrangement comprises at least one distance sensor arrangeable on a person, in particular the display unit, and/or an image recording unit, wherein it is provided in particular that the at least one distance sensor is designed to create a distance image of the interaction environment and/or the simulation environment.

A further improvement of the accuracy of the provided distance information can be achieved if the simulation arrangement comprises multiple different distance sensors, in particular based on different physical measurement principles, and if the control and processing unit is designed to select a distance sensor for the provision of distance information for the creation of the image mask according to predetermined criteria, in particular in dependence on the time of day, the solar radiation, the ambient lighting, surface properties of objects in the interaction environment and/or the simulation environment.

A further improvement of the possibility for a realistic interaction with interaction elements and influencing the simulation can be ensured if the control and processing unit is designed to carry out a method according to the invention.

Further advantages and embodiments of the invention result from the description and the appended drawings.

Exemplary embodiments of the invention which are particularly advantageous but are to be understood as nonrestrictive are schematically shown hereinafter on the basis of the appended drawings and described by way of example with reference to the drawings.

BRIEF DESCRIPTION OF THE FIGURES

FIG. 2 shows an exemplary embodiment of an interaction environment recording of the interaction environment from FIG. 1, FIG. 3 shows an exemplary embodiment of a provided environment image in the context of the first exemplary embodiment, FIG. 4 shows an exemplary embodiment of a display image in the context of the first exemplary embodiment.

DETAILED DESCRIPTION OF THE INVENTION

Figure 1:
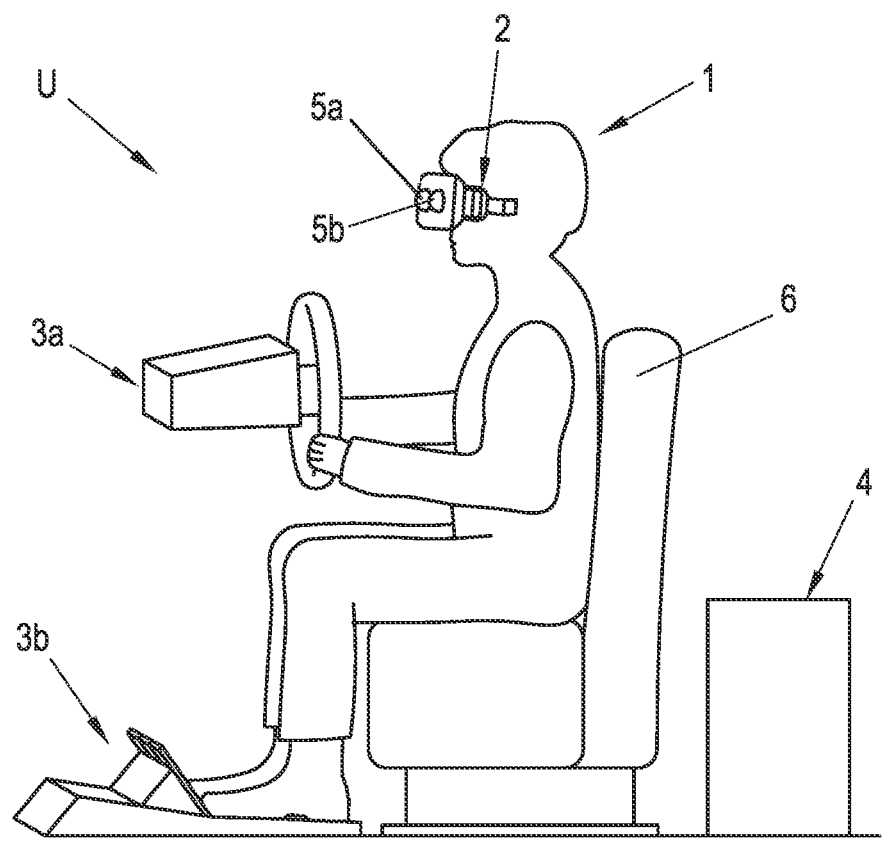
FIG. 1 shows a representation of an interaction environment having interaction elements and a person or a user in the context of a first exemplary embodiment of a method according to the invention.

As already mentioned above, a method according to the invention or a simulation arrangement according to the invention for representing an environment by means of a display unit 2 arranged on a person 1 and visible for the person 1 can particularly advantageously be used to teach persons 1 to deal with greatly varying devices or to test the reaction of the person 1 in greatly varying traffic situations and to teach the correct behavior in the respective situation.

FIGS. 1 to 4 show a schematic representation of a first exemplary embodiment of a simulation arrangement according to the invention or a method according to the invention in an interaction environment U, which is a cockpit of an automobile. A number of actuatable interaction elements 3a, 3b are arranged in the interaction environment U. In the first exemplary embodiment, these are a steering wheel and brake, clutch, and gas pedals.

The simulation arrangement furthermore comprises in the first exemplary embodiment a seat 6 and a control and processing unit 4. In the first exemplary embodiment, a person 1 sits on the seat 6. This person 1, i.e., the user of the simulation, wears a display unit 2 arrangeable on a person 1, which in the first exemplary embodiment is a set of 3D glasses for displaying display images C for the user, which is not transparent. The display unit 2 displays a display image C for the person 1 in the context of the simulation.

As schematically indicated in the first exemplary embodiment, the simulation in the first exemplary embodiment is the most realistic possible representation of a road traffic environment, in which the user of the simulation, i.e., the person 1, can have influence on the simulation by means of the interaction elements 3a, 3b, which are connected to the control and processing unit 4, and, for example, can virtually move an automobile through a simulated virtual road traffic situation.

A simulation arrangement according to the invention comprises at least one first image recording unit 5, which is designed to create an interaction environment recording A of at least parts of the interaction environment U at a respective recording point in time.

The simulation arrangement in the first exemplary embodiment comprises two first image recording units 5a, 5b, which are digital cameras. Alternatively thereto, for example, a stereo camera can also be provided. The two first image recording units 5a, 5b are arranged in the first exemplary embodiment on the person 1, i.e., specifically on the display unit 2 which the person 1 wears. The recording area of the first image recording units 5a, 5b is oriented away from the head of the person 1 at the eye height of the person 1. If the person 1 moves their head, the recording area of each of the first image recording units 5a, 5b changes and interaction environment recordings A of the interaction environment U are provided in accordance with the respective recording area. The display unit 2, the interaction elements 3a, 3b, and the two first image recording units 5a, 5b are in data communication with the control and processing unit 4. This can be achieved, for example, via a wired, radio, or WLAN connection.

To provide the most realistic possible environment image B, for example, a virtual environment image of a road intersection, which corresponds to the viewing angle from the position of the person 1 in the interaction environment U, the control and processing unit 4 first ascertains the position of the person 1. This can take place with the aid of at least one of the first image recording units 5a, 5b, which can compute a relative position, for example, on the basis of certain reference points in space, which is referred to as inside-out tracking. Alternatively, the position of the person 1 can, for example, be ascertained on the basis of an external unit, for example a further image recording unit or an emitter for infrared light, for example, which can compute the absolute position in space.

Subsequently, an image mask is provided for the creation of the display image C which is to be displayed by the display unit 2. For this purpose, for example, at least one distance sensor can be arranged, for example, on the person 1 or relative thereto, which measures the distance of the person 1 to the interaction environment U, for example to one of the interaction elements 3*a*, 3*b* in the cockpit, and transmits it to the control and processing unit 4.

In the first exemplary embodiment, such a distance sensor is integrated in the display unit 2. Alternatively thereto, the distance sensor can be fastened in another way, for example, on the clothing of the person 1, or by means of a fixing belt, for example. Alternatively thereto, such a distance sensor can also be located in the immediate environment of the person or can be installed adjacent to or above the person 1 in the interaction environment U on a holding device.

If, as in the first exemplary embodiment, two first image recording units 5*a*, 5*b* are provided, alternatively thereto the control and processing unit can also ascertain these items of interaction environment distance information on the basis of the interaction environment recordings A provided by the first image recording unit 5*a*, 5*b*. For this purpose, for example, a stereo superposition can be carried out of the RGB image data of the interaction environment recordings A provided by the two first image recording units 5*a*, 5*b*.

The control and processing unit 4 now establishes the position of the person 1 in the interaction environment U and associates the items of interaction environment distance information with the individual image areas of the interaction environment recording A.

Additionally or alternatively thereto, it is possible that the control and processing unit 4 ascertains at least one image parameter value of the individual image areas of the at least one interaction environment recording A position by position, i.e., for example, pixel by pixel. Such image parameter values are, for example, image sharpness value, brightness value, contrast value, or a color value.

This association of items of distance information and/or image parameter values with image areas of the interaction environment recording A forms the foundation for the creation of an image mask, which is used for the creation of the display image C. The image mask is created here in such a way that the depiction of the individual interaction elements 3*a*, 3*b* contained in the at least one interaction environment recording A is represented in the display image C.

Individual positions on the interaction environment recording A, the environment image B, the image mask, and the display image C are associated with one another so that the interaction environment recording A and the environment image B, when superimposed, result in a display image C that upon display by the display unit 2 is sharp, thus not blurry, in the viewing center point of the display unit 2 and no double images are visible in this area. For this purpose, the recordings, for example, of the virtual and real environment, i.e., the interaction environment recording A and the environment image B and the image mask B, can advantageously be of equal size, so that the association or positioning of the individual image areas or pixels with one another is particularly simple. With arbitrary, also different sizes of the interaction environment recording A, the environment image B, and the image mask B, the association of their individual image areas or pixels can be defined at least in such a way that the image center point of the recordings or the image mask "occupies" the same position and the further positions can be computed therefrom. If necessary, the control and processing unit 4 can also additionally perform a corresponding equalization and/or continuing image data processing.

The image mask is thus used to define which image areas of the interaction environment recording A and which areas of a provided environment image B are represented in the display image C, which is displayed to the person 1 by the display unit 2.

In simple terms, after application of the image mask, there are thus image points or image areas in the interaction environment recording A or the virtual or real environment image B, which are included by this image mask or which are among the set of the image points or image areas defined by the image mask and are therefore visible for the person 1, and image points or image areas which are excluded from the image mask and are therefore not visible for the person 1.

The image mask can optionally also at least partially have a predetermined transparency here, which has the result that image points or image areas included by the image mask are incorporated with a predetermined weighting in the display image C.

The image mask can be created here, for example, by checking whether the object area of the interaction environment U depicted in the respective image area of the interaction environment recording A exceeds a predetermined interaction environment distance value. Such an interaction environment distance threshold value can be stored, for example, in the control and processing unit 4 before carrying out the simulation.

If, as in the first exemplary embodiment, such an interaction environment distance threshold value is used for the creation of the image mask, it is thus checked whether the individual image areas of the interaction environment recording A are farther away than, for example, 50 cm from the person 1. The image mask is thus provided in this case so that those image areas of the interaction environment recording A, which are farther than 50 cm away from the person 1, are not represented in the display image C, while those image areas which are less than 50 cm away are represented. In the display image C (see FIG. 4), the depictions 3*a*' of the interaction element 3*a* or the steering wheel, and the depictions of the dashboard, the rearview mirror, the side mirrors, and parts of the automobile roof and the A-pillar of the interaction environment U or the cockpit, and also the depictions of the hands of the person 1 are thus visible.

Additionally or alternatively thereto, it can be checked for the creation of the image mask whether the respective image area of the interaction environment recording A exceeds at least one image parameter threshold value predetermined for the interaction environment U. Such an image parameter threshold value can be, for example, an image sharpness, brightness, contrast, or color threshold value and can be stored in the control and processing unit 4 before carrying out the simulation.

If, for example, an image sharpness threshold value is used in the creation of the image mask, it can thus be checked whether a respective image area is represented sharply, so that only sharply depicted areas of the interaction environment U, which are located close to the person 1, for example, are included in the display image C, while fuzzy areas, which are farther away, are not included in the display image C.

It is optionally also possible that, for example, a color threshold value is used in the creation of the image mask, so that, for example, objects which have a specific color are not included in the display image C, or in particular objects which have a specific color are represented in the display image C. It is optionally also possible that additionally or alternatively thereto, a brightness and/or contrast threshold value is used in the creation of the image mask, so that, for example, objects which have a specific brightness or a predetermined contrast are not included in the display image C.

In order now, in the first exemplary embodiment, to display the most realistic possible traffic situation for the person 1 in the context of the simulation, an environment image B, as schematically shown in FIG. 3, is predetermined by the control and processing unit 4, adapted to the position of the person 1. In the first exemplary embodiment, this environment image B is a depiction of a virtual environment provided by the control and processing unit 4. The environment image B in FIG. 3 is, for example, a virtual course of a road in a residential area. Alternatively thereto, an environment image B can also be predetermined which originates from a real environment.

For the creation of the display image C, in principle at least one interaction environment recording A is superimposed with the provided environment image B using the image mask pixel by pixel to form a single image. If, as in the first exemplary embodiment, two interaction environment recordings A from two first image recording units 5a, 5b are available, these can be laid one on top of another, for example, using a common image mask or two separate image masks and two environment images B so that two display images C are provided, specifically one for each eye of the user. That is to say, the merging of the respective interaction environment recording A with the respective environment image B to form a display image C with application of the image mask can be carried out separately for each image recording unit 5a, 5b. Alternatively thereto, it is also possible that a single common interaction environment recording A is created from the recordings of both first image recording units 5a, 5b and further processed.

Since the environment image B is ascertained in dependence on the position of the person 1 in the interaction environment U and is overlaid with a detail from the interaction environment recording A, a particularly realistic display image C results for the person 1, as shown in FIG. 4. If, as in the first exemplary embodiment, the hands of the person 1 and interaction elements 3a, 3b, such as the steering wheel of the interaction environment U, are also visible, this helps the person 1 in the spatial orientation during the simulation and gives the person 1 the option of reacting deliberately to the traffic situation represented by the display unit 2. Therefore, in the first exemplary embodiment not only a realistic simulation of a traffic situation is achieved, but also a realistic spatial perception is ensured, which prevents the person 1 from feeling unwell during the simulation.

Figure 5:
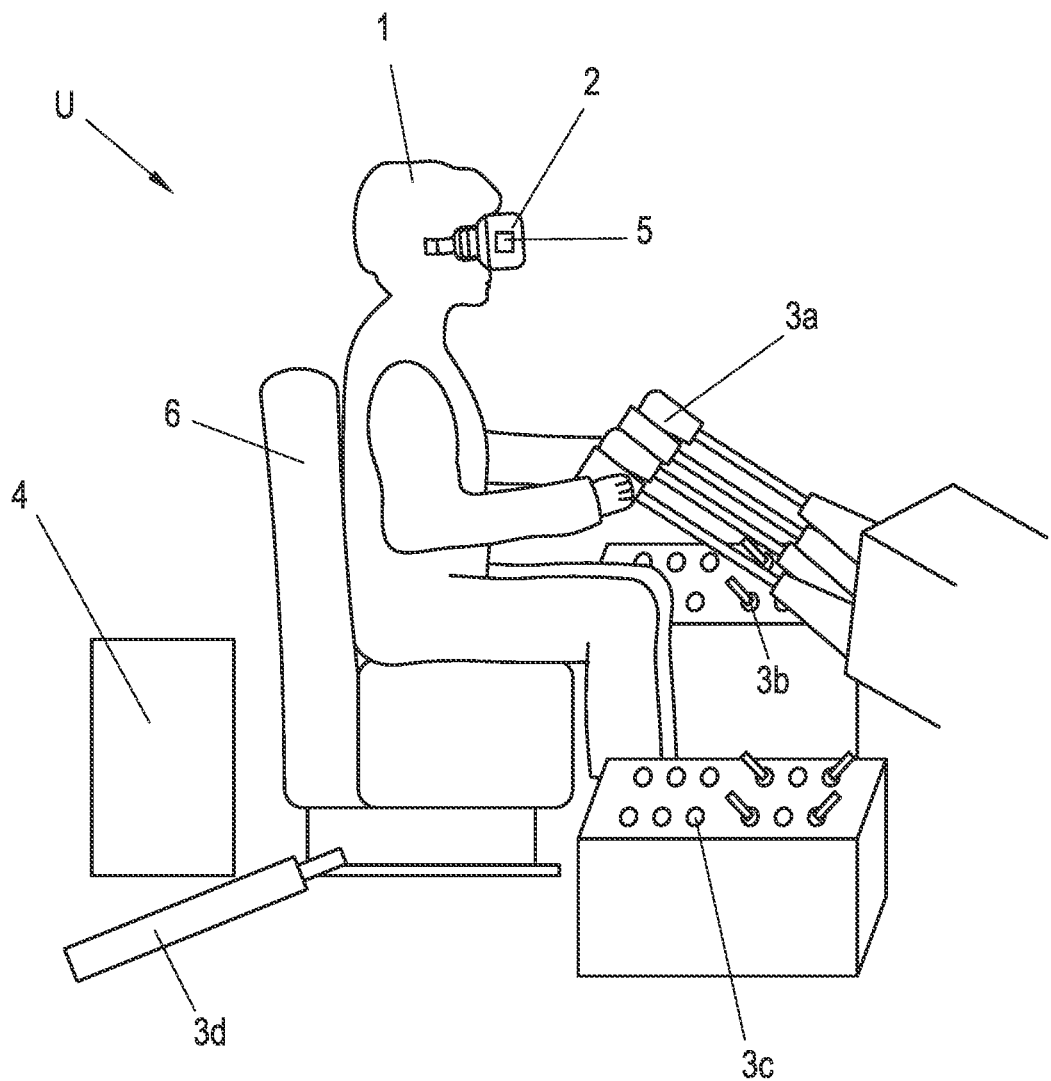
FIG. 5 shows a representation of an interaction environment having interaction elements and a person or a user in the context of a second exemplary embodiment of a method according to the invention.

A second exemplary embodiment of a method according to the invention or a simulation arrangement according to the invention will be described on the basis of FIGS. 5 to 7. FIG. 5 shows a second exemplary embodiment of an interaction environment U, which is used, for example, to simulate the operation of a crane from a crane operator cab.

As in the first exemplary embodiment, interaction elements 3a, . . . , 3d are arranged in the interaction environment U, which are shift levers and control buttons, as are required for operating a crane. The simulation arrangement furthermore comprises a seat 6, on which a person 1 is schematically shown. The person 1 wears a display unit 2, which in the second exemplary embodiment is a set of 3D glasses which displays received display images C for the person 1. A single first image recording unit 5 is arranged on the display unit 2 at the height of the eye of the person. The first image recording unit 5 is a stereo camera in the second exemplary embodiment. Furthermore, the simulation arrangement in the second exemplary embodiment comprises a control and processing unit 4. As in the first exemplary embodiment, this is in data communication with the display unit 2 of the first image recording unit and the interaction elements 3a, . . . , 3d.

In the second exemplary embodiment, the simulation arrangement, for providing the environment image C, additionally comprises a second image recording unit 51 arranged in a simulation environment S spatially separated from the interaction environment U. The second image recording unit 51 is designed to create at least one simulation environment recording, in which at least parts of the simulation environment S are depicted. Since the second image recording unit 51 is a stereo camera in the second exemplary embodiment, two simulation environment recordings are provided, which are merged to form an environment image B of the simulation environment S. The control and processing unit 4 is also in data communication with the second image recording unit 51.

Figure 6:
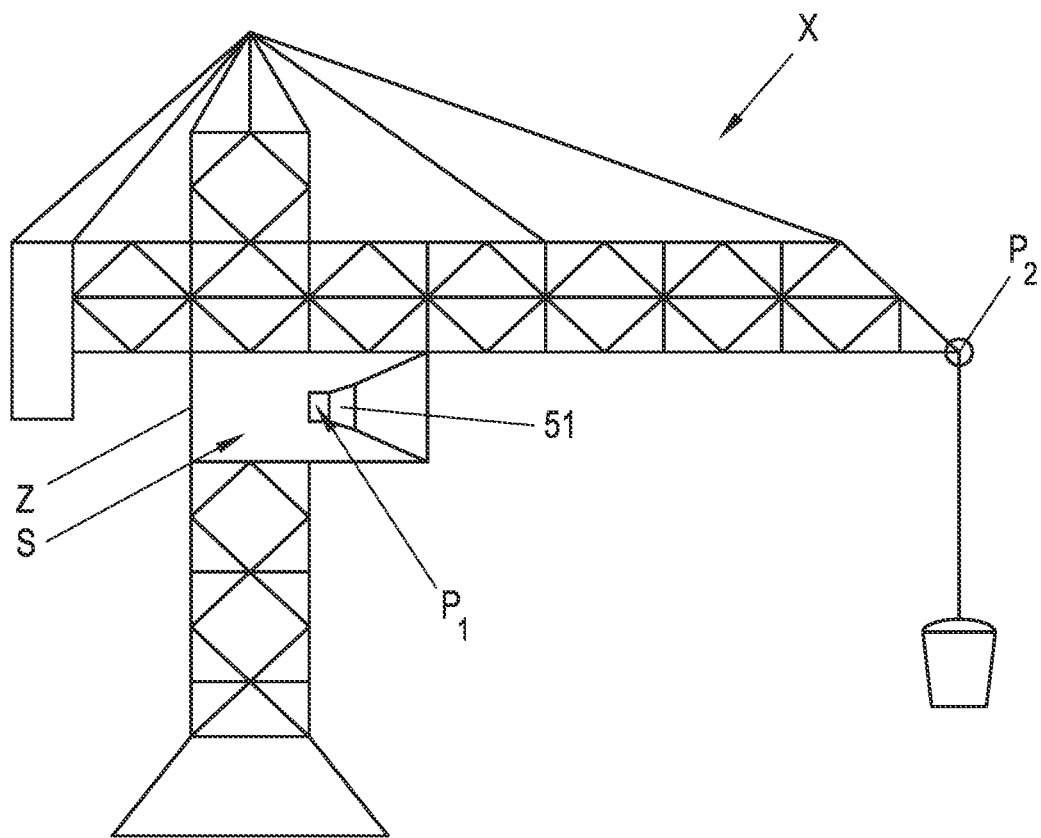
FIG. 6 shows an exemplary embodiment of a simulation environment having a crane having a crane operator cab and a second image recording unit arranged therein.

As is apparent in FIG. 6, the second image recording unit 51, which supplies simulation environment recordings for providing the environment image B, is really arranged in a crane operator cab Z of a crane X at a position $P_1$. Alternatively thereto, it is also possible to place the second image recording unit 51 at another arbitrary position of the crane, for example, at the position $P_2$ directly above the load to be lifted.

Figure 7:
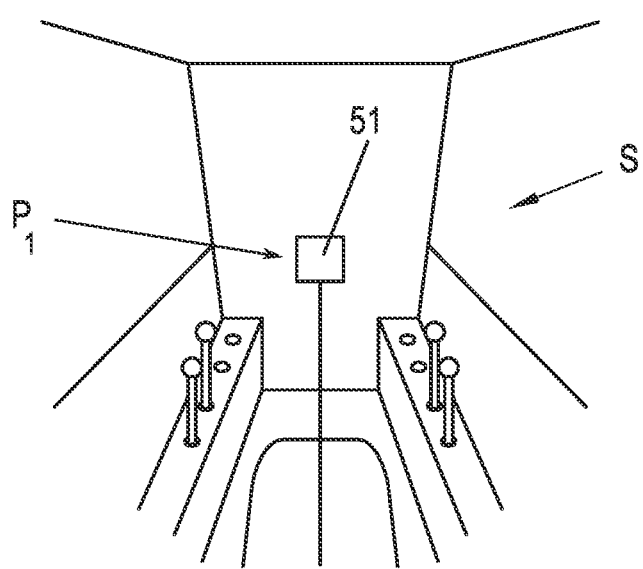
FIG. 7 shows the arrangement of the second image recording unit in the crane operator cab from FIG. 6.

FIG. 7 shows a schematic detail view of the arrangement of the second image recording unit 51 at the position $P_1$ in the simulation environment S. The second image recording unit 51 is arranged in FIG. 7 on a rotation and pivoting device at a height above the seat for a crane operator which approximately corresponds to the height of the head of a person 1 seated on the seat. The second image recording unit 51 is oriented in such a way that the recording area corresponds to the viewing direction of a person 1 seated on the seat out of the crane operator cab Z. The simulation environment recording created by the second image recording unit 2 therefore contains depictions of those objects and environment areas which are visible outside the crane operator cab Z for a person 1.

In the exemplary embodiment of the simulation environment S in FIG. 6, this would be, for example, a view of the lifting cable and the supporting means or load handling means of the crane and possibly a load fastened thereon.

The control and processing unit of the simulation arrangement is also in data communication with the second image recording unit 51. This can be achieved, for example, via a radio or WLAN connection. For the creation of the display image C, the control and processing unit not only ascertains, as in the first exemplary embodiment, the position of the person 1 in the interaction environment U, but also the position of the second image recording unit 51 in the simulation environment S. The ascertainment of the position of the second image recording unit 51 can take place here as described in the first exemplary embodiment for the position of the person 1 in the interaction environment U.

The control and processing unit 4 activates the second image recording unit 51 to provide an environment image B. In dependence on the position of the person 1 in the interaction environment U and the position of the second image recording unit 51 in the simulation environment S, at least one simulation environment recording is to be provided in such a way that the recording areas of the first image recording unit 5 and the second image recording unit 51 are coupled to one another. In this context, coupled means that the orientations of the first image recording unit 5 and the second image recording unit 51 are identical, so that, for example, when the person 1 turns their head in the interaction environment U, a corresponding rotation is also executed by the second image recording unit 51 in the simulation environment S.

Additionally to the interaction environment distance information between the person 1 and the interaction environment U, an item of simulation environment distance information between the second image recording unit 51 and the simulation environment S is ascertained. As in the first exemplary embodiment, this can take place via a distance sensor which is arranged on the second image recording unit 51, or can be ascertained by computation by the control and processing unit 4 on the basis of the simulation environment recording.

As in the first exemplary embodiment, these items of simulation environment distance information can be associated with the individual image areas of the simulation environment recording for the creation of the image mask. Additionally or alternatively thereto, it is also possible, as in the first exemplary embodiment, that the control and processing unit 4 ascertains an image parameter value of the individual image areas of the at least one simulation environment recording position by position, for example pixel by pixel, for the creation of the image mask.

The image mask is provided here, as described in the first exemplary embodiment, in such a way that individual positions on the at least one interaction environment recording U, which the first image recording unit 5 supplies, on the at least one simulation environment recording, which the second image recording unit 51 supplies, on the image mask, and on the display image C are associated with one another.

For the provision of the image mask, in addition to the steps in the first exemplary embodiment, for example, it is checked whether the object area of the simulation environment S depicted in the respective image area of the simulation environment recording exceeds a predetermined simulation environment distance value and additionally or alternatively thereto whether the respective image area of the simulation environment recording exceeds an image parameter threshold value predetermined for the simulation environment S.

For the creation of the display image C, which is displayed by the display unit 2 for the person 1, in the second exemplary embodiment, the at least one interaction environment recording A and the provided environment image B, which originates from the simulation environment S, are superimposed pixel by pixel using the image mask.

In the second exemplary embodiment, for example, as in the first exemplary embodiment, an interaction environment distance threshold value is predetermined and for the creation of the image mask, that area of the interaction environment U having the interaction elements 3a, . . . , 3d and the hands of the person 1 is displayed in the display image C, because the image areas which include these elements fall below a distance threshold value predetermined for the interaction environment U.

In the second exemplary embodiment, those image areas from the environment image B from the simulation environment S are used for the supplementation to form a display image C, in which those areas of the simulation environment S are depicted which exceed a distance threshold value predetermined for the simulation environment S. This distance threshold value predetermined for the simulation environment S can be adapted here to the distance threshold value predetermined for the interaction environment U, so that in the display image C, those areas from the simulation environment S are shown which are, for example, farther than 50 cm away from the person 1. Thus, in the second exemplary embodiment, the interaction elements 3a, . . . , 3d, i.e., the control levers and knobs from the interaction environment U, are included in the display image C, while the person 1 receives the impression of looking out of the crane operator cab Z and controlling the crane X from the crane operator cab Z.

In all embodiments of a simulation arrangement according to the invention or a method according to the invention, multiple different distance sensors, which are based, for example, on different physical measurement principles or are provided with different sensitivities, such as time-of-flight sensors, sensors for laser distance measurement, ultrasonic sensors, can be arranged, for example, on or relative to the person 1 and/or the second image recording unit 51. In this case, for example, each individual one of the sensors can create a distance image of the interaction environment U or the simulation environment S.

In this case, the control and processing unit 4 can select that distance sensor for the provision of the distance information for the creation of the image mask, according to predetermined criteria, for example, in dependence on the time of day, the solar radiation, the ambient lighting, the surface quality, structure and reflectivity of the recorded objects, etc., which supplies the most reliable items of distance information in the present situation.

In this case, it is also possible that the items of distance information provided by multiple sensors are used as the foundation for the creation of an overall image mask. For the creation of such an overall image mask, the items of distance information are processed, for example, by arithmetic functions and/or computer-based or electronics-based methods such as Kalman filters, neural networks, support vector machines, or computing a weighted average and assigned to the individual image areas of the interaction and/or simulation environment recordings, in particular pixel by pixel.

As already mentioned above, the image parameter values which can be used according to the invention for the creation of the image mask can be, for example, image sharpness, brightness, the contrast, or a color value. For the creation of the image mask and to ascertain in a manner which is particularly simple in terms of computing and time-saving whether and to what extent the at least one interaction environment recording A and/or the provided environment image B are used for the creation of the display image C, a threshold value comparison can be carried out. This also applies if items of distance information and a distance threshold value are used for the creation of the image mask.

The ascertainment of an image parameter value and the specification of an image parameter threshold value are particularly advantageous if objects in the interaction environment recording A or the simulation environment recording are to be ascertained, the surfaces of which have a predetermined superficially recognizable property such as brightness or color. The image areas to be displayed in the display image C can advantageously be defined in this case in that those objects are either represented or excluded which correspond to these predetermined image parameter criteria.

For the study as to whether an image area of the at least one interaction environment recording A or the simulation environment recording exceeds a respective predetermined distance threshold value, an envelope object can also be defined with respect to the interaction environment U and/or the simulation environment S. Such an envelope object can be defined, for example, with the aid of Boolean set operations. For this purpose, for example, a function is defined which is applied to each position or to each image value of a recording or environment in such a way that a result is provided for each value or each position, which permits a statement about the display and representation and representation form.

A display image C particularly realistic for the person 1, which is extensively free of undesired image edges and transitions, can be provided if the control and processing unit 4 creates the display image C, for example, using alpha blending. This is a procedure of scanning, which superimposes two colors or images in such a way that parts of the images are laid one on top of another and mixed, so that the impression results that parts of one image would be transparent and let the respective other image show through. One example of this is the Porter-Duff algorithm.

The transparency of the image pixels within an overlay zone, which is in a predetermined distance area around the interaction environment distance threshold value or the simulation environment distance threshold value, is predetermined, for example, according to a predetermined linear or exponential function. Directly at the interface at which the interaction environment recording A or the environment image B from the simulation environment S are merged to form a display image C, the transparency of both recordings can be set equal, for example.

In image areas of the display image C which depict environment areas located spatially closer to the person 1, the transparency, for example, of the interaction environment recording A can be selected to be lower than the transparency of the environment image B from the simulation environment S. In those image areas which depict environment areas spatially farther away from the person 1, the transparency of the environment image B from the simulation environment S can be selected to be lower than that of the interaction environment recording A.

In addition, the control and processing unit can also perform a smoothing of the image mask in the superposition area of the interaction environment recording A and the environment image B, so that the quality of the display image C is increased further.

The invention claimed is:

1. A method for representing an environment by means of a display unit disposed on a person and visible for the person as a display image in a context of a simulation, which comprises the steps of:
    carrying out the simulation in an interaction environment, wherein a plurality of actuatable interaction elements is disposed in the interaction environment and the simulation can be influenced by means of the interaction elements;
    creating at least one interaction environment recording depicting at least parts of the interaction environment by means of at least one first image recorder disposed on the person or relative to the person;
    ascertaining a position of the person in the interaction environment and an environment image from a virtual and/or real environment being provided in dependence on the position of the person;
    providing an image mask by:
        associating individual positions on the at least one interaction environment recording, the environment image, the image mask, and the display image with one another;
        ascertaining an item of interaction environment distance information between the person and the interaction environment and the interaction environment distance information is associated position by position, with individual image areas of the at least one interaction environment recording; and/or
        ascertaining at least one image parameter value of the individual image areas of the at least one interaction environment recording position by position;
    creating the image mask such way that a depiction of individual ones of the interaction elements contained in the at least one interaction environment recording is represented in the display image by checking:
        whether an object area of the interaction environment depicted in a respective image area of the at least one interaction environment recording exceeds a predetermined interaction environment distance threshold value; and/or
        whether the respective image area of the at least one interaction environment recording exceeds at least one image parameter threshold value predetermined for the interaction environment;
    superimposing the at least one interaction environment recording and the environment image pixel by pixel using the image mask;
    displaying an image superimposed in this way as the display image on the display unit;
    wherein for a provision of the environment image:
        at least one simulation environment recording depicting at least parts of a simulation environment is created by means of at least one second image recorder disposed in the simulation environment;
        wherein a position of the second image recorder in the simulation environment is ascertained; and
        wherein the environment image from the simulation environment is provided in dependence on the position of the person and the position of the second image recorder such that recording areas of the first image recorder and the second image recorder are coupled to one another;
    wherein the image mask is provided in such a way that individual positions on the at least one interaction environment recording, the at least one simulation environment recording, the image mask, and the display image are associated with one another, wherein:
        an item of simulation environment distance information between the at least one second image recorder and the simulation environment is ascertained and the simulation environment distance information is associated with individual image areas of the at least one simulation environment recording position by position; and/or
        at least one image parameter value of the individual image areas of the at least one simulation environment recording is ascertained position by position; and
    wherein the image mask is created by additionally checking:
        whether an object area of the simulation environment depicted in a respective image area of the at least one simulation environment recording exceeds a predetermined simulation environment distance threshold value; and/or whether the respective image area of the at least one simulation environment recording exceeds at least one image parameter threshold value predetermined for the simulation environment; and wherein the at least one interaction environment recording and the environment image from the simulation environment are superimposed pixel by pixel using the image mask to create the display image.

2. The method according to claim 1, which further comprises:

ascertaining the distance information on a basis of the interaction environment recording, and/or on a basis of the simulation environment recording; and/or ascertaining the distance information by means of a distance sensor disposed on the person, and/or on the second image recorder; and creating a distance image of the interaction environment, and/or the simulation environment by means of the distance sensor.

3. The method according to claim 2, wherein the distance sensor is one of a plurality of different distance sensors; and which further comprises performing a change of the different distance sensors, the distance information of which is used for a creation of the image mask, according to predetermined criteria.

4. The method according to claim 3, which further comprises using items of distance information provided by the plurality of different distance sensors as a foundation for a creation of an overall image mask.

5. The method according to claim 1, wherein the distance information is provided on a basis of the at least one interaction environment recording, and/or the simulation environment recording, by an algorithm which is based on technologies of machine learning.

6. The method according to claim 1, wherein the checking as to whether the object area of the interaction environment depicted in the image area of the at least one interaction environment recording, and/or the object area of the simulation environment depicted in the image area of the at least one simulation environment recording, exceeds a predetermined distance threshold value, and an envelope object is defined with respect to the interaction environment, and/or the simulation environment.

7. The method according to claim 1, wherein:

in the at least one interaction environment recording, and/or the at least one simulation environment recording as the environment image from the simulation environment, depictions of objects are ascertained, a surface of which has a predetermined superficially recognizable property; and the depictions of the objects ascertained in this way are not used for a superposition of the at least one interaction environment recording and the environment image.

8. The method according to claim 1, wherein an exposure and/or f-stop of the first image recorder and/or the second image recorder is adapted to objects, a distance of which exceeds a predetermined distance threshold value.

9. The method according to claim 1, wherein:

the at least one simulation environment recording is two simulation environment recordings;

the simulation environment distance information is associated with the individual image areas of the at least one simulation environment recording pixel by pixel; and/or the at least one image parameter value is selected from an image sharpness value, a brightness value, a contrast value, and a color value, and the individual image areas of the at least one simulation environment recording is ascertained pixel by pixel; and the at least one image parameter threshold value is selected from a image sharpness threshold value, a brightness threshold value, a contrast threshold value, and a color threshold value.

10. A method for representing an environment by means of a display unit disposed on a person and visible for the person as a display image in a context of a simulation, which comprises the steps of:

carrying out the simulation in an interaction environment, wherein a plurality of actuatable interaction elements is disposed in the interaction environment and the simulation can be influenced by means of the interaction elements;

creating at least one interaction environment recording depicting at least parts of the interaction environment by means of at least one first image recorder disposed on the person or relative to the person;

ascertaining a position of the person in the interaction environment and an environment image from a virtual and/or real environment being provided in dependence on the position of the person;

providing an image mask by:

associating individual positions on the at least one interaction environment recording, the environment image, the image mask, and the display image with one another;

ascertaining an item of interaction environment distance information between the person and the interaction environment and the interaction environment distance information is associated position by position, with individual image areas of the at least one interaction environment recording; and/or ascertaining at least one image parameter value of the individual image areas of the at least one interaction environment recording position by position:

creating the image mask such way that a depiction of individual ones of the interaction elements contained in the at least one interaction environment recording is represented in the display image by checking:

whether an object area of the interaction environment depicted in a respective image area of the at least one interaction environment recording exceeds a predetermined interaction environment distance threshold value; and/or whether the respective image area of the at least one interaction environment recording exceeds at least one image parameter threshold value predetermined for the interaction environment;

superimposing the at least one interaction environment recording and the environment image pixel by pixel using the image mask;

displaying an image superimposed in this way as the display image on the display unit; and wherein the image mask is created in that the distance information created position by position, and/or the image parameter value ascertained position by position, is used to ascertain whether and/or to what extent the at least one interaction environment recording and/or the environment image are used for creation of the display image.

11. A method for representing an environment by means of a display unit disposed on a person and visible for the person as a display image in a context of a simulation, which comprises the steps of:
carrying out the simulation in an interaction environment, wherein a plurality of actuatable interaction elements is disposed in the interaction environment and the simulation can be influenced by means of the interaction elements;
creating at least one interaction environment recording depicting at least parts of the interaction environment by means of at least one first image recorder disposed on the person or relative to the person;
ascertaining a position of the person in the interaction environment and an environment image from a virtual and/or real environment being provided in dependence on the position of the person;
providing an image mask by:
associating individual positions on the at least one interaction environment recording, the environment image, the image mask, and the display image with one another;
ascertaining an item of interaction environment distance information between the person and the interaction environment and the interaction environment distance information is associated position by position, with individual image areas of the at least one interaction environment recording; and/or
ascertaining at least one image parameter value of the individual image areas of the at least one interaction environment recording position by position;
creating the image mask such way that a depiction of individual ones of the interaction elements contained in the at least one interaction environment recording is represented in the display image by checking:
whether an object area of the interaction environment depicted in a respective image area of the at least one interaction environment recording exceeds a predetermined interaction environment distance threshold value; and/or
whether the respective image area of the at least one interaction environment recording exceeds at least one image parameter threshold value predetermined for the interaction environment;
superimposing the at least one interaction environment recording and the environment image pixel by pixel using the image mask;
displaying an image superimposed in this way as the display image on the display unit; and
wherein:
a superposition zone is predetermined in a predetermined distance area around a predetermined distance threshold value, and upon a superposition of the at least one interaction environment recording and the environment image, a transparency of image points of the at least one interaction environment recording and the environment image which depict the object areas within the superposition zone, is predetermined; and
it is provided that the object points of the at least one interaction environment recording and the environment image, which form object areas, a distance of which corresponds to the distance threshold value, are predetermined to be equally transparent upon the superposition.

12. A method for representing an environment by means of a display unit disposed on a person and visible for the person as a display image in a context of a simulation, which comprises the steps of:
carrying out the simulation in an interaction environment, wherein a plurality of actuatable interaction elements is disposed in the interaction environment and the simulation can be influenced by means of the interaction elements;
creating at least one interaction environment recording depicting at least parts of the interaction environment by means of at least one first image recorder disposed on the person or relative to the person;
ascertaining a position of the person in the interaction environment and an environment image from a virtual and/or real environment being provided in dependence on the position of the person;
providing an image mask by:
associating individual positions on the at least one interaction environment recording, the environment image, the image mask, and the display image with one another;
ascertaining an item of interaction environment distance information between the person and the interaction environment and the interaction environment distance information is associated position by position, with individual image areas of the at least one interaction environment recording; and/or
ascertaining at least one image parameter value of the individual image areas of the at least one interaction environment recording position by position;
creating the image mask such way that a depiction of individual ones of the interaction elements contained in the at least one interaction environment recording is represented in the display image by checking:
whether an object area of the interaction environment depicted in a respective image area of the at least one interaction environment recording exceeds a predetermined interaction environment distance threshold value; and/or
whether the respective image area of the at least one interaction environment recording exceeds at least one image parameter threshold value predetermined for the interaction environment;
superimposing the at least one interaction environment recording and the environment image pixel by pixel using the image mask;
displaying an image superimposed in this way as the display image on the display unit; and
wherein the image mask is smoothed in a superposition area of the at least one interaction environment recording and the environment image, so that individual pixel values of the image mask define a ratio in which relevant pixel values of the at least one interaction environment recording and the environment image are superimposed on one another.

13. A method for representing an environment by means of a display unit disposed on a person and visible for the person as a display image in a context of a simulation, which comprises the steps of:
carrying out the simulation in an interaction environment, wherein a plurality of actuatable interaction elements is disposed in the interaction environment and the simulation can be influenced by means of the interaction elements;
creating at least one interaction environment recording depicting at least parts of the interaction environment by means of at least one first image recorder disposed on the person or relative to the person;
ascertaining a position of the person in the interaction environment and an environment image from a virtual and/or real environment being provided in dependence on the position of the person;
providing an image mask by:
    associating individual positions on the at least one interaction environment recording, the environment image, the image mask, and the display image with one another;
    ascertaining an item of interaction environment distance information between the person and the interaction environment and the interaction environment distance information is associated position by position, with individual image areas of the at least one interaction environment recording; and/or
    ascertaining at least one image parameter value of the individual image areas of the at least one interaction environment recording position by position;
creating the image mask such way that a depiction of individual ones of the interaction elements contained in the at least one interaction environment recording is represented in the display image by checking:
    whether an object area of the interaction environment depicted in a respective image area of the at least one interaction environment recording exceeds a predetermined interaction environment distance threshold value; and/or
    whether the respective image area of the at least one interaction environment recording exceeds at least one image parameter threshold value predetermined for the interaction environment;
superimposing the at least one interaction environment recording and the environment image pixel by pixel using the image mask;
displaying an image superimposed in this way as the display image on the display unit;
wherein:
    the display unit includes a set of 3D glasses to display the display image;
    the interaction environment is a cockpit;
    the at least one interaction environment recording is two interaction environment recordings;
    the interaction environment distance information is associated pixel by pixel with the individual image areas of the at least one interaction environment recording;
    the at least one image parameter value is an image parameter value selected from an image sharpness value, a brightness value, a contrast value, or a color value; and
    the at least one image parameter threshold value is selected from an image sharpness threshold value, a brightness threshold value, a contrast threshold value, or a color threshold value.

14. A simulation configuration for representing an environment as a display image in a context of a simulation, the simulation configuration comprising:
a display unit disposable on a person being configured to display received display images for the person;
an interaction environment;
a plurality of actuatable interaction elements disposed in said interaction environment, wherein the simulation is influenceable by means of said interaction elements;
at least one first image recorder disposable on or relative to the person, and configured to create at least one interaction environment recording at least of parts of the interaction environment at a respective recording point in time; and
a control and processing unit in data communication with said display unit and said at least one first image recorder, said control and processing unit configured:
    to ascertain a position of the person in said interaction environment and provide an environment image from a virtual and/or real environment in dependence on the position;
    to activate said at least one first image recorder to create interaction environment recordings;
    to ascertain or process an item of distance information between the person and said interaction environment and to associate the distance information with individual image areas of the at least one interaction environment recording position by position and/or to ascertain at least one image parameter value of the individual image areas of the at least one interaction environment recording position by position; and
    to create an image mask such that a depiction of individual ones of said interaction elements contained in the at least one interaction environment recording is represented in the display image by checking:
        whether an object area of the interaction environment depicted in a respective image area of the at least one interaction environment recording exceeds a predetermined interaction environment distance threshold value; and/or
        whether the respective image area of the at least one interaction environment recording exceeds the at least one image parameter threshold value predetermined for the interaction environment;
    to associate individual positions on the at least one interaction environment recording, the environment image, the image mask, and the display image with one another;
    to superimpose the at least one interaction environment recording and the environment image pixel by pixel using the image mask; and
    to transmit an image superimposed in this way as the display image to said display unit;
the simulation configuration further comprising at least one second image recorder disposed in a simulation environment and configured to create at least one simulation environment recording depicting at least parts of the simulation environment,
wherein said control and processing unit is in data communication with said second image recorder; and
wherein said control and processing unit further configured:
    to ascertain a position of said second image recording unit in the simulation environment;
    to activate said at least one second image recorder to provide the environment image from the simulation environment in dependence on the position of the person in said interaction environment and the position of said second image recorder such that recording areas of said at least one first image recorder and said at least one second image recorder are coupled to one another;

to ascertain or process an item of distance information between said at least one second image recorder and the simulation environment and to associate the distance information with the individual image areas of the at least one simulation environment recording position by position and/or to ascertain at least one image parameter value of the at least one simulation environment recording position by position; and to create the image mask by additionally checking:

whether an object area of the simulation environment depicted in a respective image area of the at least one simulation environment recording exceeds a predetermined simulation environment distance threshold value; and/or whether the respective image area of the at least one simulation environment recording exceeds at least one image parameter threshold value predetermined for the simulation environment;

to associate individual positions on the at least one interaction environment recording, the simulation environment recording as an environment image, the image mask, and the display image with one another; and to superimpose the at least one interaction environment recording and the environment image from the simulation environment pixel by pixel using the image mask to create the display image.

15. The simulation configuration according to claim 14, further comprising at least one distance sensor disposable on the person and/or said first image recorder, said at least one distance sensor is configured to create a distance image of the interaction environment and/or the simulation environment.

16. A simulation configuration for representing an environment as a display image in a context of a simulation, the simulation configuration comprising:

a display unit disposable on a person being configured to display received display images for the person;

an interaction environment;

a plurality of actuatable interaction elements disposed in said interaction environment, wherein the simulation is influenceable by means of said interaction elements;

at least one first image recorder disposable on or relative to the person, and configured to create at least one interaction environment recording at least of parts of the interaction environment at a respective recording point in time; and a control and processing unit in data communication with said display unit and said at least one first image recorder, said control and processing unit configured:

to ascertain a position of the person in said interaction environment and provide an environment image from a virtual and/or real environment in dependence on the position;

to activate said at least one first image recorder to create interaction environment recordings;

to ascertain or process an item of distance information between the person and said interaction environment and to associate the distance information with individual image areas of the at least one interaction environment recording position by position and/or to ascertain at least one image parameter value of the individual image areas of the at least one interaction environment recording position by position; and to create an image mask such that a depiction of individual ones of said interaction elements contained in the at least one interaction environment recording is represented in the display image by checking:

whether an object area of the interaction environment depicted in a respective image area of the at least one interaction environment recording exceeds a predetermined interaction environment distance threshold value; and/or whether the respective image area of the at least one interaction environment recording exceeds the at least one image parameter threshold value predetermined for the interaction environment;

to associate individual positions on the at least one interaction environment recording, the environment image, the image mask, and the display image with one another;

to superimpose the at least one interaction environment recording and the environment image pixel by pixel using the image mask;

to transmit an image superimposed in this way as the display image to said display unit the simulation configuration further comprising a plurality of different distance sensors, and said control and processing unit is configured to select a distance sensor from said plurality of different distance sensors for providing distance information for a creation of the image mask according to predetermined criteria.

17. A simulation configuration for representing an environment as a display image in a context of a simulation, the simulation configuration comprising:

a display unit disposable on a person being configured to display received display images for the person;

an interaction environment;

a plurality of actuatable interaction elements disposed in said interaction environment, wherein the simulation is influenceable by means of said interaction elements;

at least one first image recorder disposable on or relative to the person, and configured to create at least one interaction environment recording at least of parts of the interaction environment at a respective recording point in time; and a control and processing unit in data communication with said display unit and said at least one first image recorder, said control and processing unit configured:

to ascertain a position of the person in said interaction environment and provide an environment image from a virtual and/or real environment in dependence on the position;

to activate said at least one first image recorder to create interaction environment recordings;

to ascertain or process an item of distance information between the person and said interaction environment and to associate the distance information with individual image areas of the at least one interaction environment recording position by position and/or to ascertain at least one image parameter value of the individual image areas of the at least one interaction environment recording position by position; and to create an image mask such that a depiction of individual ones of said interaction elements contained in the at least one interaction environment recording is represented in the display image by checking:

whether an object area of the interaction environment depicted in a respective image area of the at least one interaction environment recording exceeds a predetermined interaction environment distance threshold value; and/or whether the respective image area of the at least one interaction environment recording exceeds the at least one image parameter threshold value predetermined for the interaction environment;

to associate individual positions on the at least one interaction environment recording, the environment image, the image mask, and the display image with one another;

to superimpose the at least one interaction environment recording and the environment image pixel by pixel using the image mask;

to transmit an image superimposed in this way as the display image to said display unit; and to carry out a method for representing an environment by the display unit disposed on a person and visible for the person as a display image in a context of a simulation, the method comprising the steps of:

carrying out the simulation in the interaction environment, with the plurality of actuatable interaction elements disposed in the interaction environment and the simulation being influenced by the interaction elements;

creating the at least one interaction environment recording depicting at least parts of the interaction environment by the at least one first image recorder disposed on the person or relative to the person;

ascertaining a position of the person in the interaction environment and providing the environment image from a virtual and/or real environment in dependence on the position of the person;

providing the image mask by:

associating the individual positions on the at least one interaction environment recording, the environment image, the image mask, and the display image with one another;

ascertaining the item of interaction environment distance information between the person and the interaction environment and associating the interaction environment distance information position by position, with individual image areas of the at least one interaction environment recording; and/or ascertaining the at least one image parameter value of the individual image areas of the at least one interaction environment recording position by position;

creating the image mask in such a way that a depiction of individual ones of the interaction elements contained in the at least one interaction environment recording is represented in the display image by checking:

whether the object area of the interaction environment depicted in a respective image area of the at least one interaction environment recording exceeds the predetermined interaction environment distance threshold value; and/or whether the respective image area of the at least one interaction environment recording exceeds the at least one image parameter threshold value predetermined for the interaction environment;

superimposing the at least one interaction environment recording and the environment image pixel by pixel using the image mask; and displaying the image superimposed in this way as the display image on the display unit.

18. A simulation configuration for representing an environment as a display image in a context of a simulation, the simulation configuration comprising:

a display unit disposable on a person being configured to display received display images for the person;

an interaction environment;

a plurality of actuatable interaction elements disposed in said interaction environment, wherein the simulation is influenceable by means of said interaction elements;

at least one first image recorder disposable on or relative to the person, and configured to create at least one interaction environment recording at least of parts of the interaction environment at a respective recording point in time; and a control and processing unit in data communication with said display unit and said at least one first image recorder, said control and processing unit configured:

to ascertain a position of the person in said interaction environment and provide an environment image from a virtual and/or real environment in dependence on the position;

to activate said at least one first image recorder to create interaction environment recordings;

to ascertain or process an item of distance information between the person and said interaction environment and to associate the distance information with individual image areas of the at least one interaction environment recording position by position and/or to ascertain at least one image parameter value of the individual image areas of the at least one interaction environment recording position by position; and to create an image mask such that a depiction of individual ones of said interaction elements contained in the at least one interaction environment recording is represented in the display image by checking:

whether an object area of the interaction environment depicted in a respective image area of the at least one interaction environment recording exceeds a predetermined interaction environment distance threshold value; and/or whether the respective image area of the at least one interaction environment recording exceeds the at least one image parameter threshold value predetermined for the interaction environment:

to associate individual positions on the at least one interaction environment recording, the environment image, the image mask, and the display image with one another;

to superimpose the at least one interaction environment recording and the environment image pixel by pixel using the image mask;

to transmit an image superimposed in this way as the display image to said display unit;

wherein:

said display unit is a set of 3D glasses;

said interaction environment is a cockpit;

an association of the distance information with the individual image areas of the at least one interaction environment recording is performed pixel by pixel;

the image parameter value is selected from the group consisting of: an image sharpness value, a brightness value, a contrast value, and a color value; and the at least one image parameter threshold value is selected from the group consisting of: an image sharpness threshold value, a brightness threshold value, a contrast threshold value, and a color threshold value.

\* \* \* \* \*